United States Patent Office 3,530,155
Patented Sept. 22, 1970

3,530,155
HYDROCARBOXYLATION OF OLEFINS
Donald M. Fenton, Anaheim, Calif., assignor to Union Oil Company of California, Los Angeles, Calif., a corporation of California
No Drawing. Filed Feb. 6, 1968, Ser. No. 703,850
Int. Cl. C11c 1/06
U.S. Cl. 260—413
15 Claims

ABSTRACT OF THE DISCLOSURE

The invention comprises hydrocarboxylation of olefins by contacting the olefin under liquid phase conditions with a catalyst comprising a platinum or palladium complex with an aromatic phosphine, water and carbon monoxide. High reactivity and high yields of the normal acid are obtained by incorporating in the reaction medium an anionic or nonionic surface active agent.

---

The invention relates to a method for the production of carboxylic acid from olefins, carbon monoxide and water.

It is known that olefins can be hydrocarboxylated in liquid phase reactions using a catalyst comprising a palladium salt in complex association with a phosphine, e.g., triphenylphosphine, as shown in Netherlands Pat. No. 6,409,121. This reaction, however, generally has a relatively low reactivity and produces acids having a high content of the iso or branched chain acids. Since the straight chain acid is generally the most useful product, being employed in the preparation of plasticizers, ester solvents, detergents, etc., it is desirable to provide a process that produces a higher yield of the normal or straight chain acid than of the isomer or branch chain acid.

It is therefore an object of this invention to provide a hydrocarboxylation reaction that produces carboxylic acids having a high concentration of the normal or straight chain acid.

It is also an object of this invention to provide a highly reactive system for the hydrocarboxylation of olefins.

Other and related objects will be apparent from the following description of the invention.

I have now found that when the hydrocarboxylation reaction is performed in an aqueous medium containing an anionic or nonionic surface active agent a high degree of reactivity is achieved simultaneous with an increase in the yield of the normal carboxylic acid from the reaction. In addition, I have found that the reactivity can be further enhanced and the yield of normal carboxylic acids can be further increased by the use of a carboxylic acid as a reaction solvent.

The process of my invention therefore comprises the hydrocarboxylation of an olefin by contacting the olefin and carbon monoxide with an aqueous reaction medium comprising a catalyst that is an aromatic phosphine-palladium or platinum complex and an anionic or nonionic surface active agent and, preferably, also a carboxylic acid reaction solvent.

The contacting is effected at relatively mild conditions including temperatures from 30° to 300° C. and pressures from 1 to about 1000 atmospheres, sufficient to maintain liquid phase conditions. The reaction is performed batchwise or in a continuous fashion and the products are recovered by any suitable method, e.g., distillation, extraction, etc.

The catalyst for the reaction is preferably formed in the reaction medium by charging thereto the phosphine and the platinum or palladium metal component. The platinum or palladium can be charged to the reaction medium as the metal, oxide or as a salt soluble in the particular reaction medium, e.g., as a halide, nitrate or carboxylate. Examples of suitable catalyst components are palladium, platinum, palladium oxide, platinum oxide, palladium chloride, platinum chloride, palladium bromide, platinum fluoride, palladium bromide, platinum iodide, palladium nitrate, or the platinum or palladium salts of carboxylic acids having from 1 to about 20 carbons, e.g., palladium acetate, platinum acetate, palladium propionate, platinum valerate, palladium caproate, palladium caprolate, etc. The amount of the noble metal used in the reaction system can vary over wide limits from about 0.005 to about 5 weight percent of the reaction medium; preferably from about 0.05 to about 1.5 weight percent.

The other component of the catalyst comprises an aromatic phosphine. Examples of suitable materials are triphenylphosphine, diphenylethylphosphine, phenyldimethylphosphine, trip(p-tolyl)phosphine, tri(m-tolyl)-phosphine, tri-xylylphosphine, naphthyldiphenylphosphine, tri(p-chlorophenyl)phosphine, tri(p-cumenyl)-phosphine, tolylphenylmethylphosphine, tripseudocumenylphosphine, tri(p-ethylphenyl) tri(p-amylphenyl-phosphine, ethylene-bis-diphenylphosphine, tetramethylene-bis-diphenylphosphine, etc.

The reaction is performed under liquid phase conditions in the presence of a liquid organic solvent which has a solvency for the catalyst and which, preferably, is inert to the reaction conditions. Various organic liquids can be employed for this purpose such as hydrocarbons, sulfoxides, sulfones, amides, ketones, ethers and esters. As discussed above, however, the preferred reaction solvent is a carboxylic acid and most preferred is a fatty acid having from 2 to about 20 carbon atoms.

Illustrative of the preferred class of solvents are acetic, propionic, butyric, isobutyric, pivalic, pentanoic, hexanoic, heptanoic, octanoic, benzoic, toluic, phthalic, decanoic, dodecanoic, pentadecanoic, etc. In general, any carboxylic acid that is liquid at the reaction conditions can be employed; preferably those acids which are also liquid at ambient temperatures are employed such as the aforementioned acids having from about 2 to about 8 carbons, or mixtures of acids having a melting range below ambient temperatures.

Other organic solvents that can be employed instead of or in addition to the carboxylic acids include the alkyl and aryl sulfoxides and sulfones such as dimethylsulfoxide, propylethylsulfoxide, diisopropylsulfone, decylmethylsulfoxide, butylamylsulfone, diisooctylsulfoxide, diphenylsulfoxide, methylbenzylsulfone, etc.

Another class of organic solvents which have solvency for the catalyst and which are inert to the reaction are the various amides such as formamide, dimethyl formamide, ethylisopropyl formamide, acetamide, N-phenylacetamide, N,N-dipropylacetamide, isobutyramide, isovaleric amide, isocaprylic amide, isoundecylic amide, etc.

Various alkyl and aryl ketones can also be employed as a reaction solvent, e.g., acetone, methylethyl ketone, diethyl ketone, diisopropyl ketone, ethyl-n-butyl ketone, methyl-n-amyl ketone, cyclohexanone, di-iso-butyl ketone, etc.

Ethers can also be employed as the reaction solvent, e.g., di-iso-propyl ether, di-n-butyl ether, ethylene glycol di-iso-butyl ether, methyl o-tolyl ether, ethylene glycol di-butyl ether, di-iso-amyl ether, methyl p-tolyl ether, methyl m-tolyl ether, ethylene glycol di-iso-amyl ether, diethylene glycol diethyl ether, ethyl benzyl ether, diethylene glycol di-ethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dibutyl ether, etc.

Various esters can also be employed as the solvent, e.g., ethyl formate, methyl acetate, ethyl acetate, n-propyl formate, iso-propyl acetate, ethyl propionate, n-propyl acetate, sec-butyl acetate, iso-butyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, iso-amyl n-butyrate, diethyl oxalate, isoamyl isovalerate, methyl benzoate, diethyl malonate, ethyl benzoate, methyl salicylate, n-propyl benzoate, n-dibutyl oxalate, n-butyl benzoate, di-isoamyl phthalate, dimethyl phthalate, diethyl phthalate, benzyl benzoate, n-dibutyl phthalate, etc.

The reaction is performed on an olefinic compound. Preferably hydrocarbon olefins are employed and these can be alpha olefins or internal olefins as well as non-conjugated diolefins. The olefinic compounds can have from about 2 to about 25 carbons and in addition to the aforedescribed hydrocarbons, olefinic compounds containing inert functional groups in non-conjugated positions can also be employed. As thus defined the olefin has the following structure:

$$R_2R_1C=CR_3R_4$$

wherein $R_1$, $R_2$, $R_3$ and $R_4$ are hydrogen, alkyl, aryl, cycloalkyl or $-CH_2CH_2R_5$ wherein $R_5$ is cycloalkenyl, alkenyl, or comprises an inert functional group such as a halo, nitro, sulfo, carbonyl, carboxyl, alkoxy or acyloxy group or wherein one of the $R_1$ and $R_2$ groups together with one of the $R_3$ and $R_4$ groups is an alkylene having from 2 to about 6 carbons, thereby forming a cyclo-alkenyl reactant.

Examples of suitable olefins include ethylene, propylene, butene-1, butene-2, pentene-1, hexene-2, cyclohexene, heptene-3, cycloheptene, octene-1, cyclooctene, styrene, nonene-2, propylcyclohexene, allylbenzene, decene-3, dicyclopentadienyl, undecene-1, propylene tetramer, pentadecene-1, hexadecene-3, heptadecene-2, octadecene-1, eicosene-2, pentacosene-1, 4-chlorobutene-1, 6,6-dichlorohexene-1, 5,6-dibromooctene-1, p-nitroallyl-benzene, p-sulfostyrene, oleic acid, linoleic acid, linolinic acid, decenoic acid, undecenoic acid, octenoic acid, erucic acid, 3-butenal, butenyl methyl ketone, pentenyl ethyl ketone, dioctenyl ketone, 5-methoxyoctene-1, 4-ethoxy-decene-1, 4-propoxypentene-1, butenyl acetates, pentenyl n-butyrate, octenyl acetate, 1,6-heptadiene, 1,5-hexadiene, 3,7-eicosadiene, etc. Of the aforementioned, the lower molecular weight olefins having from about 2 to about 12 carbons are a preferred class and the alpha olefins are also a preferred class of reactants.

The preferred class of surface active agents comprises the high molecular weight saturated fatty acids such as those having from about 12 to about 25 carbons, e.g., lauric, myristic, palmitic, stearic, arachidic, behenic, etc. Other anionic surface active agents can be employed such as the anionic compounds obtained by sulfonation of fatty derivatives such as sulfonated tallow, sulfonated vegetable oils, sulfonated marine animal oils. Commercially available surfactants of this group are: Tallosan RC, a sulfonated tallow of the General Dyestuff Corp.; Gamafon K, highly sulfonated fatty acids of coconut oil and Finish WFS, a sulfonated sperm oil.

Various sulfonated fatty acid esters of mono and polyvalent alcohols are also suitable such as: Nopco 2272R, a sulfonated butyl ester of a fatty acid; Mekal N3, tri(2-ethylbutyl)sulfotricarboxylate; and Nopco 1471, sulfonated oleoglyceride.

Sulfated and sulfonated fatty alcohols are also useful as the surfactant employed in my invention. Typical of this class of anionic agents are: Duponal ME, sodium lauryl sulfate; Duponal L142, sodium cetyl sulfate; Duponal LS, sodium oleyl sulfate; Tergitol 4, sodium tetradecyl sulfonate; Tergitol 7, sodium heptadecyl sulfonate; etc.

Nonionic surface active agents can also be employed in my invention. Among the various nonionic surface active agents which are useful are various ethylene oxide condensation products with fatty acids, alcohols and glycerides, phenolic compounds, fatty amides, amines, fatty partial esters of hexitans and polypropylene glycols.

Examples of ethylene oxide condensation products with fatty acids are the following: Nonisol 100, ethylene oxide condensation product with lauric acid; Nonisol 200, ethylene oxide condensation product of oleic acid; Nonisol 300, ethylene oxide condensation product of stearic acid; etc.

Examples of ethylene oxide condensation products with fatty and rosin alcohols are: Brij 30, polyoxyethylene lauryl ether; Synthetics D–37, ethylene oxide condensate of hydroabietyl alcohol, etc.

Examples of ethylene condensation products with alkyl and alkenyl phenols are: Igepal W, Igepal C, Antarox A–200, ethylene oxide condensation products of n-dodecyl and isododecyl phenol; Triton TX45, octyl phenoxy polyethoxy ethanol; etc.

Examples of ethylene condensation products with fatty amines and amides are the Ethoamides prepared by condensation of ethylene oxide with fatty acid amides having from 8 to 18 carbons.

Ethylene oxide condensation products of fatty acid partial esters of hexitans are also suitable surface active agents for use in my invention. These agents are commercially available as the various Span and Tween products which are polyoxyethylene derivatives of sorbitan monolaurate, sorbitan monopalmitate, sorbitan monostearate, sorbitan monooleate, sorbitan trioleate, etc.

The surface active agent is employed in the reaction system at concentrations from about 0.5 to about 50 weight percent of the reaction solvent. Preferably the concentration employed is from about 1 to about 10 weight percent; however, a preferred higher concentration range can be employed when the surface active agent is one of the high molecular weight saturated fatty acids, e.g., from about 5 to about 25 weight percent.

The reaction is performed at relatively mild conditions including temperatures from about 30° to about 300° C.; preferably from about 75° to about 175° C. and most preferably from about 125° to about 160° C. The reaction is performed at pressures from about atmospheric to about 1000 atmospheres. Pressures from about 5 to about 100 atmospheres are preferred and these pressures are used to maintain liquid phase conditions at the reaction temperatures and in addition to improve the rate of reaction by increasing the solubility of the carbon monoxide reactant in the liquid phase.

The carbon monoxide concentration is not critical to the reaction. Thus the partial pressure of the carbon monoxide in the reaction system can vary from about 10 to about 100 percent of the total pressure on the system. When the lower molecular weight olefins are used which have a substantial volatility at the reaction temperature, e.g., those olefins having from about 2 to about 6 carbons, it is preferred to employ the carbon monoxide partial pressures from about 10 to about 90 percent of the total pressure on the reaction system. The partial pressure of the carbon monoxide can be adjusted if desired by the addition of an inert gas to the reaction zone such as nitrogen, carbon dioxide, etc., which serves as a diluent and thereby moderates the reaction.

The reaction can be performed batchwise or in a continuous fashion. When operating batchwise, the catalyst and the reaction medium is charged to the reaction zone and contacted therein with the olefin and the carbon monoxide. The olefin can be initially charged to the reaction zone which is then pressured with the carbon monoxide and heated to the desired reaction temperature. When performing the reaction in a continuous fashion, the reaction medium can be charged to the reaction zone to form a liquid phase therein and the olefin and carbon monoxide can be continuously introduced into the reaction zone to contact the reaction medium containing the catalyst.

The gaseous reactants can be withdrawn as a separate effluent, cooled, depressured and the non-condensibles, chiefly carbon monoxide, can be recycled to further contacting. The liquid product can be withdrawn separately from the reaction zone by withdrawing a stream of the liquid reaction medium contained therein and recovering the desired carboxylic acid therefrom by suitable processing such as extraction or distillation. Preferably distillation is employed, particularly with the lower molecular weight acid products, i.e., those having up to about 16 carbons and this distillation can be performed at atmospheric or subatmospheric pressures as apparent to those skilled in the art. The reaction can also be performed in a continuous fashion by simultaneously introducing the liquid phase reaction medium, olefin and carbon monoxide into a tubular reaction zone and withdrawing the reaction medium and reacted gases therefrom, separating the gases from the reaction medium and subsequently distilling the latter to recover the desired product.

The following examples will illustrate the practice of my invention and demonstrate the results obtainable thereby:

EXAMPLES 1 TO 3

In these examples 1 gram palladous chloride, 10 grams triphenylphosphine, 400 grams acetic acid, 15 grams of water, 70 grams of a mixed $C_6$–$C_7$ alpha olefin and 10 grams of the indicated surface active agent were added to a stirred, one-half gallon autoclave. The autoclave was pressured with 800 p.s.i. carbon monoxide initially, heated to 125° C. and maintained at that temperature for 2 hours. The results are shown in the following table.

TABLE I

| Ex. | Surface Active Agent | Product |
|---|---|---|
| 1 | Nonylphenol condensed with 10 moles ethylene oxide. | α-Methylhexanoic acid, 15.5 g.; heptanoic and α-methylheptanoic acids, 43.4 g.; octanoic acid, 12.4 g. |
| 2 | Pluronics F-68 (1,500–1,800 M.W. polypropylene glycol condensed with 200 moles ethylene oxide). | α-Methylhexanoic acid, 12.2 g.; heptanoic and α-methylheptanoic acids, 34.6 g.; octanoic acid, 12.2 g. |
| 3 | Stearic acid | α-Methylhexanoic acid, 21.6 g.; heptanoic and α-methylheptanoic acids, 45 g.; octanoic acid, 10.6 g. |

EXAMPLES 4 TO 9

These examples show the effect of using stearic acid as the surface active agent when different aromatic phosphines are used as catalyst components. In each example ½ gram palladous chloride, 3 grams triarylphosphine, 400 ml. glacial acetic acid, 15 grams of water, 80 grams of 1-octene and the stearic acid, when used, were added to a stirred, one-half gallon autoclave which was initially purged with nitrogen. The autoclave was pressured with 800 p.s.i. carbon monoxide, heated to 125° C. and maintained at that temperature for 2 hours. The aromatic phosphine employed and results are shown in Table II. It will be noted that use of the surface active agent resulted in each instance in either an increase in yield of acid or an increase in the ratio of normal to iso acid, or both.

TABLE II

| Ex. | Surface active agent | Triarylphosphine | Total weight acid produced, g. | Ratio of normal to iso acid [1] |
|---|---|---|---|---|
| 4 | None | Triphenylphosphine | 80 | 2.0 |
| 5 | 10 g. stearic acid | do | 98 | 1.0 |
| 6 | None | Tri-p-tolylphosphine | 86 | 1.2 |
| 7 | 10 g. stearic acid | do | 87 | 1.4 |
| 8 | None | Tri-m-tolylphosphine | 78 | 1.4 |
| 9 | 10 g. stearic acid | do | 58 | 2.8 |

[1] "Iso acid" is all the acid produced other than normal.

I claim:
1. In a hydrocarboxylation process wherein an olefin, carbon monoxide and water are contacted with a reaction medium comprising a catalyst consisting essentially of from about 0.005 to about 5.0 weight percent of a noble metal selected from the class consisting of platinum and palladium and an aromatic phosphine; the improvement of conducting the process in the presence of 0.5 to 50 weight percent of an anionic surface active agent selected from the group consisting of a saturated fatty acid having 12 to about 25 carbons, a sulfonated animal oil, a sulfonated vegetable oil, a sulfonated fatty acid ester, a sulfated fatty alcohol, and a sulfonated fatty alcohol or a nonionic surface active agent.

2. The process of claim 1 wherein said noble metal is palladium and said phosphine is triphenylphosphine.

3. The process of claim 1 wherein said olefin is a hydrocarbon olefin having from 2 to about 12 carbons.

4. The process of claim 3 wherein said olefin is an alpha olefin.

5. The process of claim 1 wherein the reaction zone is maintained at a temperature between about 75° and 175° C.

6. The process of claim 1 in which the reaction medium comprises an organic solvent.

7. The process of claim 6 in which the organic solvent consists at least in part of a fatty acid having from about 2 to 20 carbon atoms.

8. The process of claim 7 in which the fatty acid is acetic acid.

9. The process of claim 1 in which the surface active agent is a saturated fatty acid having from about 12 to about 25 carbon atoms.

10. The process of claim 9 in which the fatty acid is stearic acid.

11. The process of claim 1 in which the surface active agent is a condensation product of a phenolic compound and ethylene oxide.

12. The process of claim 11 in which the surface active agent is a condensation product of nonyl phenol and about 10 moles of ethylene oxide.

13. The process of claim 1 in which the surface active agent is a condensation product of polypropylene glycol and ethylene oxide.

14. The process of claim 13 in which the polypropylene glycol has a molecular weight of about 1500–1800 and is condensed with about 200 moles of ethylene oxide.

15. The process of claim 1 wherein the nonionic surface active agent is a condensation product of a fatty acid, alcohol, glyceride, fatty amide, or amine and ethylene oxide.

References Cited

UNITED STATES PATENTS 3,381,030   4/1968   Biale et al. _____ 260—514
3,437,676   4/1969   Kutepow et al. _____ 260—514

FOREIGN PATENTS 499,662   2/1954   Canada.

OTHER REFERENCES

Detergents and Emulsifiers (D & E), 1963, Annual, p. 112.

LEWIS GOTTS, Primary Examiner

E. G. LOVE, Assistant Examiner

U.S. Cl. X.R.

106—277, 287; 252—106, 142, 351, 380; 260—410.9; 424—318